J. MOTT.
Side-Hill Plow.

No 57,171.  Patented Aug 14, 1866.

Witnesses:
Wm Smith
Gus A Manktey

Inventor:
John Mott

UNITED STATES PATENT OFFICE.

JOHN MOTT, OF DANVILLE, CALIFORNIA.

IMPROVEMENT IN DOUBLE REVOLVING PLOWS.

Specification forming part of Letters Patent No. 57,171, dated August 14, 1866.

*To all whom it may concern:*

Be it known that I, JOHN MOTT, of Danville, county of Contra Costa, State of California, have invented certain new and useful Improvements in Mott's Double Revolving Plow; and I do hereby declare the following description and accompanying drawings are sufficient to enable any person skilled in the art or science to which it most nearly appertains to make and use my said improvements without further invention or experiment.

The nature of my invention relates to improvements in the manner of the construction and arrangement of standards and set-screws, so that clogging will be prevented; also, to the cutting of a wider furrow in light soil, and the lever for locking and unlocking the plows for changing from right to left.

Figure 1:
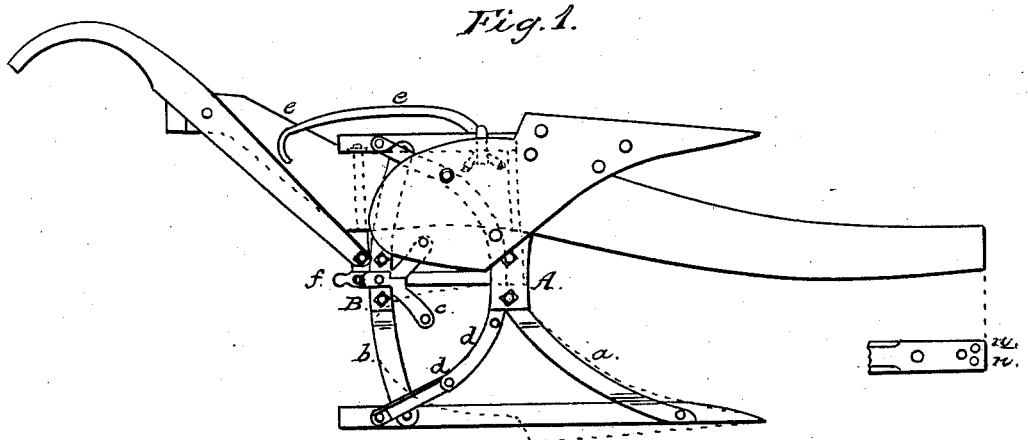
Figure 2:
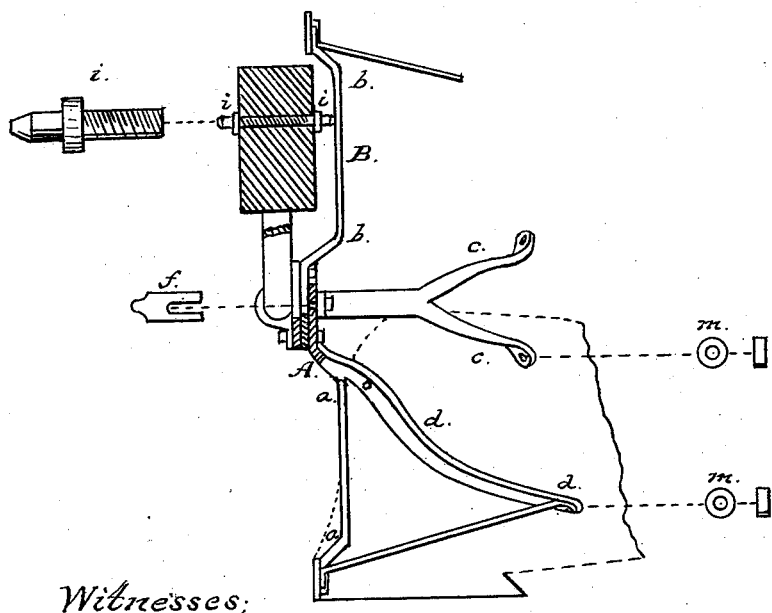

In the drawings, Figure 1 represents a side elevation of my plow with end of beam segregated; Fig. 2, end or back view, shown in sections.

A A, Figs. 1 and 2, represent the main or front standard, constructed of one piece of metal and divided to near the axis of revolution, forming four diverging curved arms, $a$ $a$ $d$ $d$. The portion $a$ is curved and bent so as to set back from the edge of the mold-boards, with still another curve near its lower extremity and just above the land-sides, to which it is bolted. This is to avoid the collection of dirt, which would prevent the plows from locking should the arm come out flush with the mold-boards.

The rear arms, $d$ $d$, are about the same length as those above described, conforming in shape to the mold-boards, and fastened to them by bolts, one near the top and one near the foot of each.

The rear or vertical standard, B, conforms in shape to the center of the front standard, A, having a depression, $b$ $b$, in the opposite face, by which it is connected to the axis by two bolts and nuts passing through box and strap. The upper and lower portions of this standard are bent in opposite directions to that of the center, conforming in length to the depth of the beam, against which it is placed when locked, and fastened at their extremities to the land-sides, and when the plows are in their respective locks these bent arms rest alternately against a set-screw, $l$ $l$, placed through the beam, setting each one inch, more or less, from the beam, to compare with the thickness of the adjustable washers.

By this means the plows will be prevented from coming in direct contact with the beam, and by placing washers in their respective places, as (described in this and my previous specifications,) or by removing them and turning the set-screws out or in, the plows are arranged to run to or from land.

The heads of the set-screws are so made as to conform in shape as nearly as possible to that of the end of the first finger, so that clay or adobe soil will not adhere to them.

A forked brace, $c$ $c$, with head bent at right angles, is on the rear standard, between the nuts in the depression, its arms being attached to the top of each mold-board, which combines the strength of all parts of the plow.

A forked washer, $f$ $f$, is placed under the head of the above-described brace, to be removed when adjustable washers are put under the ends of the back standards; also, washers $m$ $m$ are placed under the ends of the arms of the brace and front standards, (marked $o$ $o$ $o$ $o$,) to cause the plows to turn wider furrows in stubble land or light soil.

The lever $e$ $e$, which is connected to the sweep which locks the plows, is constructed in one piece and curved, so as, when raised for unlocking, it will be in easy reach of the plowman, and when not in use falls between the handles.

Having thus described my improved revolving double plows, what I claim, and desire to secure by Letters Patent, is—

1. The peculiar depressions in the front and back standards, $a$ $a$ $b$ $b$, and extension of the arms $d$ $d$ of the front standard, conforming to the mold-boards, and the forked brace $c$, for strengthening the plows, as described.

2. The forked washer $f$, and adjustable washers $m$ $m$, and lever $e$ $e$, and the peculiar shape of the outer ends of the set-screws $l$ $l$, substantially as described, and for the purposes set forth.

In witness whereof I have hereunto set my hand and seal.

JOHN MOTT. [L. S.]

Witnesses:
C. W. M. SMITH,
GUS. A. MANTHEY.